Dec. 10, 1935.   H. S. HUBBELL   2,023,684
VARIABLE PITCH PROPELLER FOR AIRCRAFT
Filed Aug. 25, 1933   4 Sheets-Sheet 1
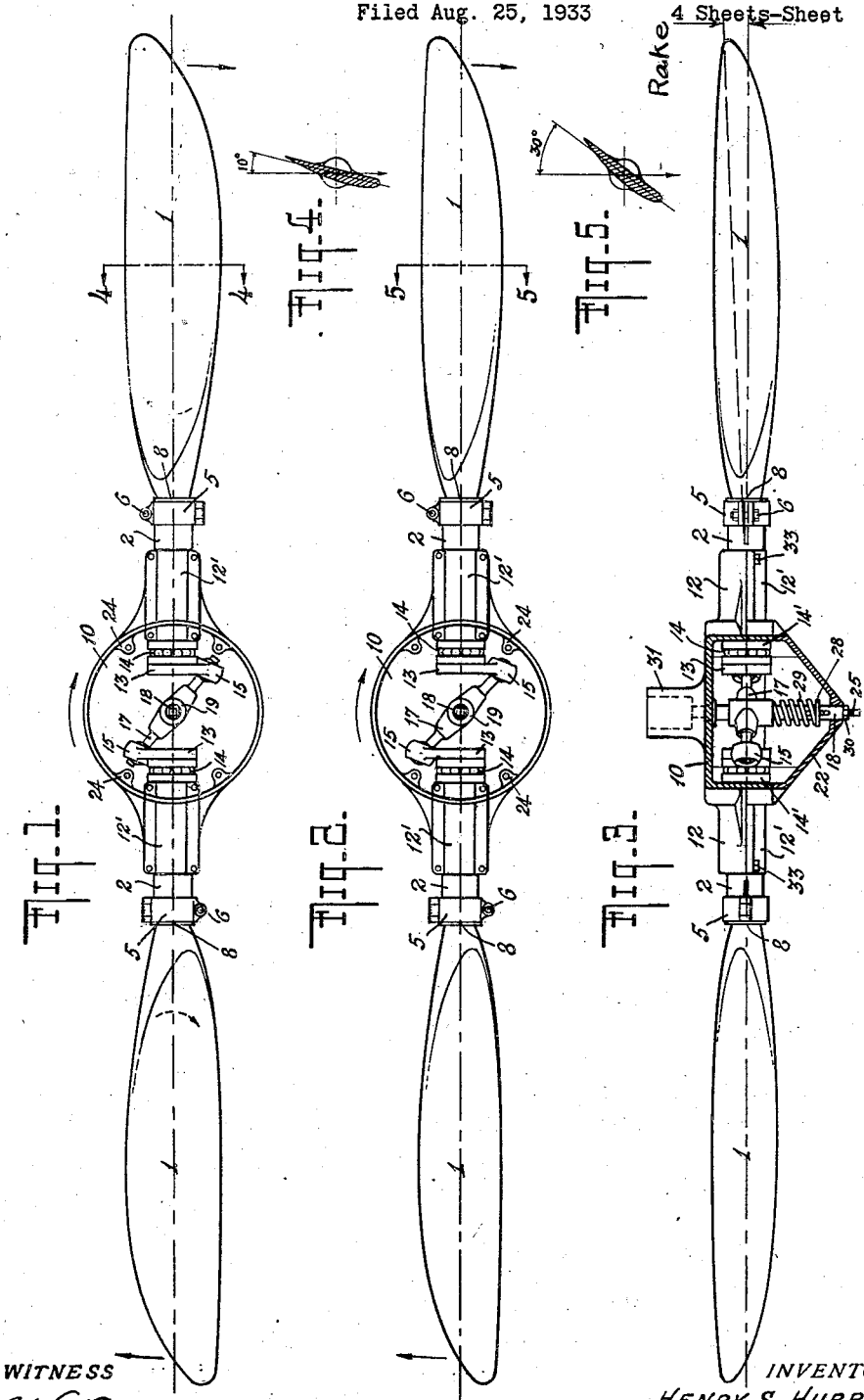
WITNESS
INVENTOR
HENRY S. HUBBELL
BY
ATTORNEYS Dec. 10, 1935.  H. S. HUBBELL  2,023,684
VARIABLE PITCH PROPELLER FOR AIRCRAFT
Filed Aug. 25, 1933  4 Sheets-Sheet 2
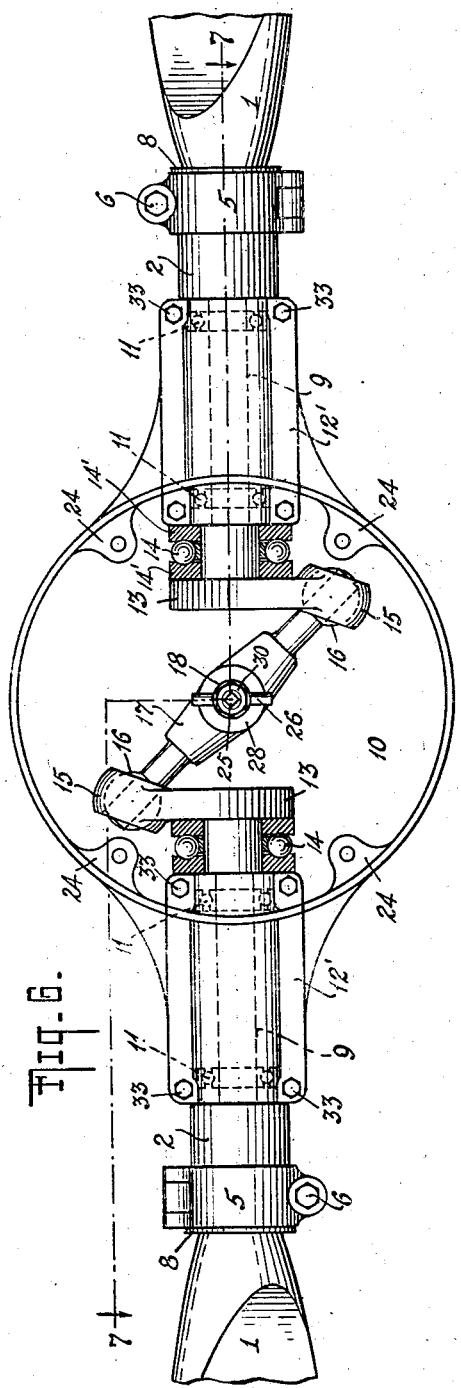
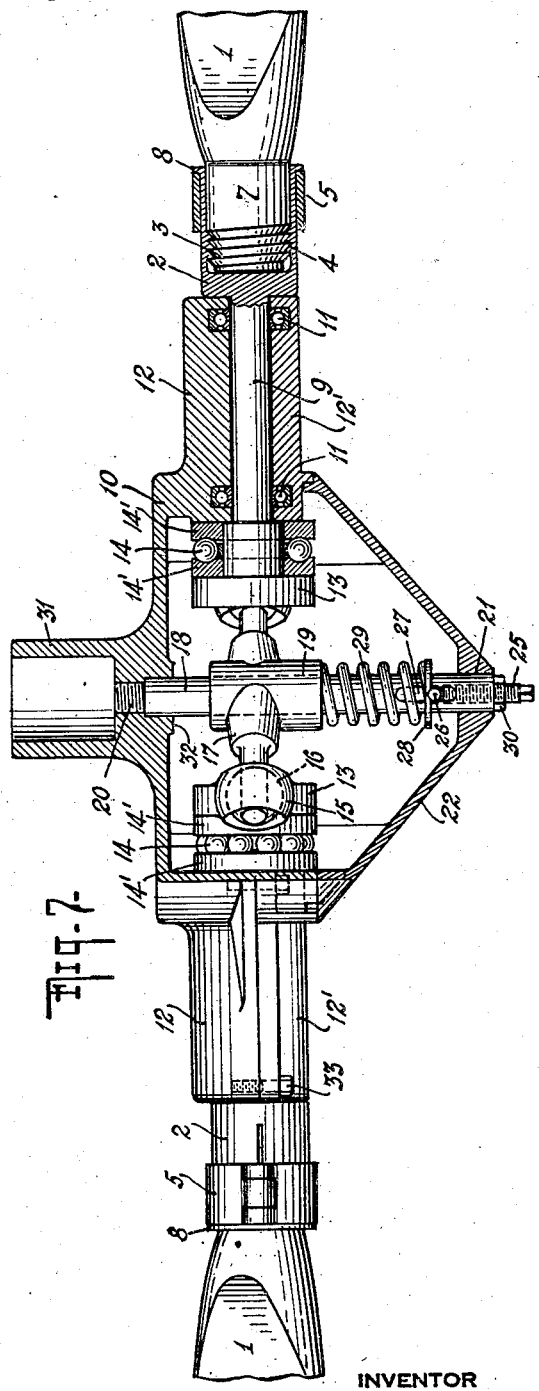
INVENTOR
HENRY S. HUBBELL

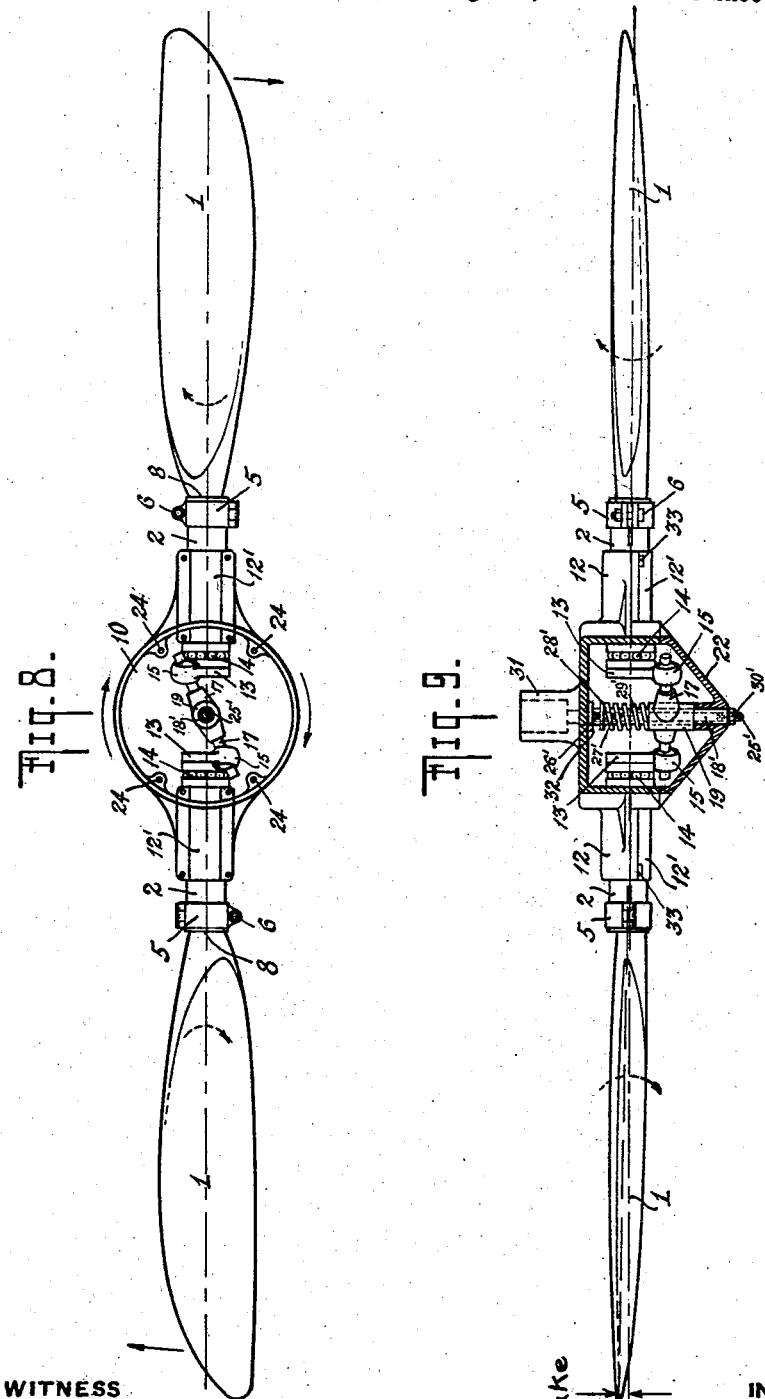

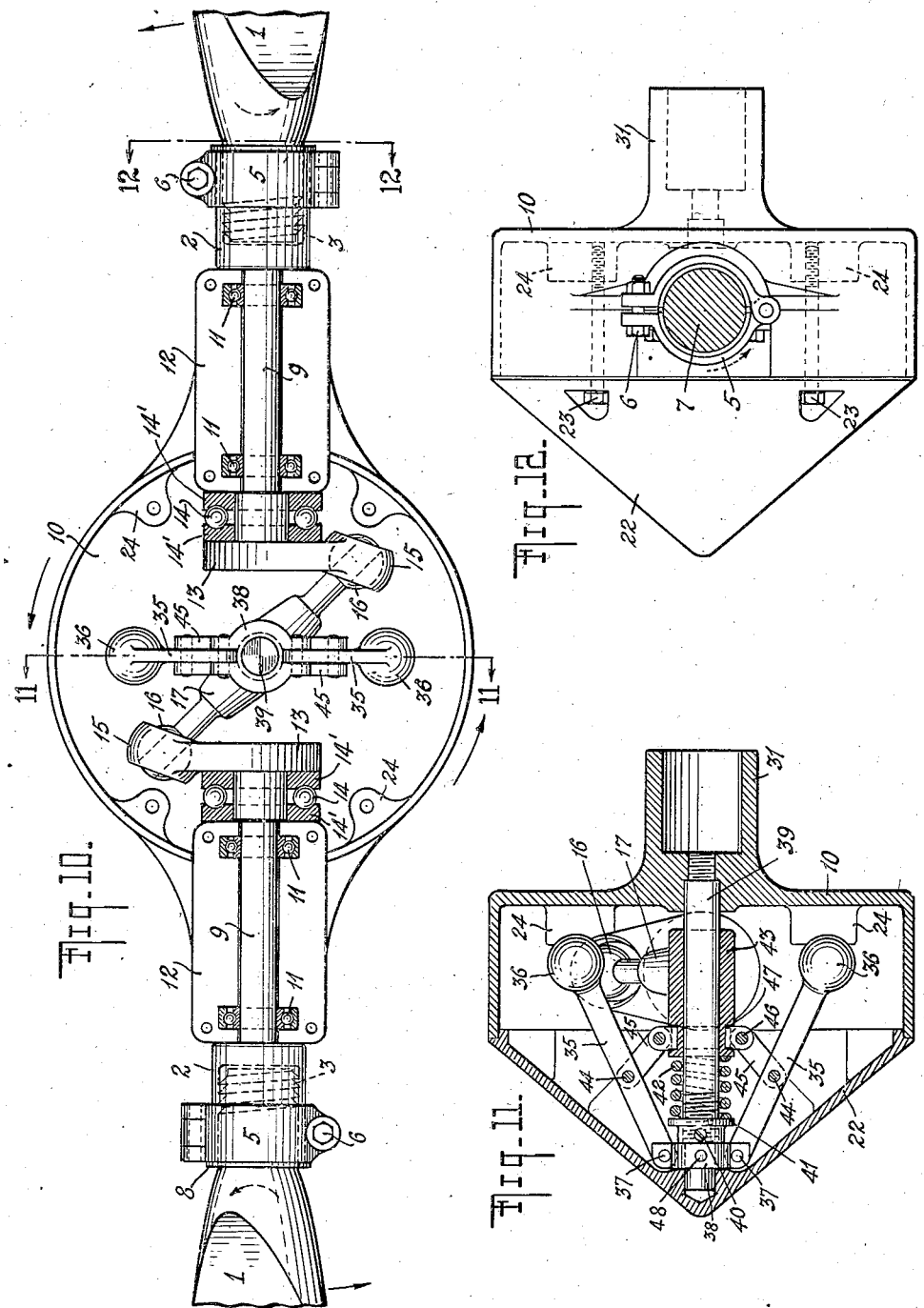

Patented Dec. 10, 1935

2,023,684

UNITED STATES PATENT OFFICE 2,023,684

VARIABLE PITCH PROPELLER FOR AIRCRAFT

Henry S. Hubbell, Dedham, Mass.

Application August 25, 1933, Serial No. 686,671

11 Claims. (Cl. 170—162)

This invention relates to propellers and more particularly to a variable pitch propeller which will enable an aircraft engine to make use of the full power it develops under all flying conditions. The object of the invention is to supply a simple, reliable, automatically functioning, safe and relatively inexpensive device which will make it available for use on a practical scale.

The advantages of a variable pitch propeller are well understood but they have been overshadowed by the disadvantages of extra weight and complicated mechanism, including in most cases an added control to the many duties that now absorb the pilot's attention while flying.

Due to the fact that the blades of a propeller are not symmetrically disposed about a radial center line, the centrifugal force produces a twisting moment which is much larger than and opposite to that produced by the air resistance which also tends to turn the blades in the hub ordinarily making it necessary to apply an undesirably large force to change the pitch in one direction. These forces vary while the plane is taking off or in flight due to variations in the density of the air, the speed of the motor and the like. In my invention, the resultant of these opposed forces is relied upon to supply the means for turning the blades in the hub to the extent demanded by the varying conditions which exist in the operation of the plane.

My invention is illustrated in the accompanying drawings in which Fig. 1 is a front view of a left-hand propeller embodying my invention with the hub cap removed showing the relation of the elements at normal rotation of the propeller; Fig. 2 is a view similar to that shown in Fig. 1 showing the relation of the elements at the maximum pitch of the propeller blades; Fig. 3 is a top longitudinal view of Fig. 2 with the hub cap in position and having a portion of the hub removed to show the relation of the elements; Fig. 4 is a sectional view of the blade taken on the line 4—4 of Fig. 1; Fig. 5 is a sectional view of the blade taken on the line 5—5 of Fig. 2; Fig. 6 is an enlarged view of a portion of Fig. 2, partly in section; Fig. 7 is a section along line 7—7 of Fig. 6; Fig. 8 is a front view of a left-hand propeller with the hub cap removed showing the relation of the elements at normal rotation of the propeller in a modified form of my invention; Fig. 9 is a top longitudinal view of Fig. 8 with the hub cap in position and having a portion of the hub removed to show the relation of the elements; Fig. 10 is a fragmentary front view, partly in section, of a right-hand propeller showing another embodiment of my invention; Fig. 11 is a section along line 11—11 of Fig. 10; Fig. 12 is a side view of the propeller hub looking in the direction of line 12—12 of Fig. 10 showing the means which secure the blades to the hub and the attaching means for the hub cap.

In the drawings the reference character 1 indicates the blades of the propeller which are not symmetrical about their radial center line due to the fact that they have sweep-back and rake. Blades having sweep-back and rake are of well known type, the expression "sweep-back" referring to the somewhat tapered terminal of the free ends of the blades (illustrated in the blades of Figs. 1, 2 and 8) while "rake" refers to the tilt of the propeller blades or the mean angle which the line joining the centers of area of the sections makes with a plane perpendicular to the axis of rotation, such tilt being clearly present in the blades as illustrated in Figs. 3 and 9. The propeller blades are attached at their inner ends to an enlarged split portion 2 of the arbors or shafts 9, as shown in Fig. 7. The ends of the propeller blades secured by the portions 2 are provided with screw threads 3 which engage the internally threaded portions 4 on the inner periphery of the shaft portions 2. A clamp ring 5 adapted to be tightened by a bolt 6 is mounted adjacent the outer end of each of the shaft portions 2 and exerts a binding pressure on the end portions 7 of the propeller blades. The threaded portions 3 and 4 and the collars 5 therefor, together form a binding means for securely locking the propeller blades in position in the enlarged portion 2 of the shafts 9. A flange 8 integral with the enlarged portion 2 of shafts 9 prevents slipping of the clamp rings thereon due to centrifugal force while the propeller is rotating. The shafts or arbors 9 are journaled in suitable ball bearings 11 in the boss members 12 and 12' of the hub member 10 to allow for free rotation of the propeller blades with a minimum of friction. Cranks 13 are bolted, or attached in any suitable manner on the ends of the arbors or shafts 9 interiorly of the hub 10. Interposed between the cranks 13 and the inner side wall of the hub 10 are anti-friction bearings 14 mounted in suitable race rings 14' to reduce the frictional contact between these parts due to centrifugal force on the blades. As the component of centrifugal force exerting an outward pull on the blades is greater than the component tending to twist the blades, the bearings 14 are larger than the bearings 11.

The socket members 15 of the cranks 13 are adapted to receive and retain the cooperating ball members 16. The two ball members 16 are connected by a rigid transverse element or lever 17 whose ends slide within bores in the ball members. The lever 17 has formed centrally thereof an enlarged apertured portion or sleeve 19 which is slidably positioned on the spindle 18. Referring particularly to the structure shown in Figs. 1-7 inclusive, the spindle 18 which at one end is supported centrally of the hub 10 by threaded engagement therewith, as at 20, extends forwardly and engages a centrally disposed opening 21 in the hub cap 22. An adjustable screw member 25 which extends beyond the outer surface of the hub cap 22, is in threaded engagement with the inner periphery of the spindle 18, and through the medium of a pin 26 which moves in the guides or apertures 27 on the spindle 18 and whose ends engage the outer side of an annular member 28, serves to control the compression of a spring 29 which is axially supported on the spindle 18 intermediate the sleeve 19 and the annular member 28. A lock nut 30 serves to hold the screw thread member 25 in the position to which it has been adjusted. The hub cap 22 which encloses the moving parts in the hub 10 is held in position thereon by means of the bolts 23 which are in threaded engagement with the bosses 24 of the hub 10 as shown in Fig. 12.

A boss 31 on the hub 10 is adapted to accommodate the forwardly projecting end of the driving shaft of the motor (not shown) and may be held securely thereon in any suitable manner. The motor rotates the left-hand propeller shown in Figs. 1-7 inclusive in a clockwise direction as viewed in Figs. 1 and 2. Under normal operation of the motor the spring 29 which is under compression control of the screw thread member 25, holds the several parts of the structure in the position shown in Fig. 1 and is sufficiently powerful to maintain the position of the propeller blades as shown in that figure under ordinary normal conditions of flight. Should the plane, however, ascend to altitudes of more rarefied air, there will be offered less resistance to the revolving propeller blades and as a consequence the motor will gain in speed. As the speed of the engine increases the centrifugal force on the blades will increase to such an extent that it will overcome the opposing air resistance on the blades caused by and proportional to the speed of the plane and produce a twisting moment in the blades which will cause the blades to turn in the direction indicated by the broken arrows in Fig. 1 so that their pitch is increased. As the blades increase their pitch the shafts 9 are caused to rotate and through the ball and socket connection, 15, 16 the sleeve 19 is forced outwardly on the spindle 18 against the pressure of spring 29. The degree to which the spring 29 will be compressed depends upon the degree of increase in pitch of the propeller blades. In other words, as the plane rises higher and higher, the increasing rarity of the air will offer less and less resistance to the blades, and as a result, the component of centrifugal force tending to twist the blades will become greater and greater thus causing the blades to increase their pitch against the pressure of spring 29 and adapt themselves to conditions as they are to make use of the full power developed by the engine. As the plane descends and the air becomes less and less rarefied, the blades will again return to their normal pitch under the compressive force of the spring 29.

As the variation in the pitch of the blades for all conditions of flight is preferably limited to between 10° for the minimum pitch, as shown in Fig. 4, and 30° for the maximum pitch, as shown in Fig. 5, there is accordingly provided in my device a stop 32 to limit the movement of the sleeve 19 in one direction to a point corresponding to the most desirable minimum pitch of the propeller blades. The screw member 25 may be adjusted in the spindle 18, so that, together with the compressed spring 29, washer 28 and pin 26, it operates to limit the movement of the sleeve 19 in the opposite direction to a point corresponding to the maximum desired pitch of the propeller blades under any conditions.

In a modified form of my invention the cranks 13 are mounted on the arbors or shafts 9 in a position directly opposite from that of the cranks in Fig. 1 and the spring 29 is positioned between the stop 32 and the sleeve 19 as shown in Fig. 9. In this modified structure, when the component of centrifugal force tending to turn the blades is increased the blades will twist or turn in the direction indicated by the broken lines in Figs. 8 and 9 so that their pitch is increased. As the blades turn, the shaft 9 is caused to rotate in the same direction and through the ball and socket connection, 15, 16 forces the sleeve 19 inwardly on the spindle 18' against the pressure of spring 29' which compresses an amount depending upon the size of the twisting moments acting on the blades. Thus it is seen that the spring 29 may be positioned on either side of the sleeve 19 to balance the twisting moments acting on the blades. In the structure shown in Figs. 8 and 9, the tension in the spring 29' is calibrated or adjusted by means of a nut 30' which seats on the end of the spindle and is in threaded engagement with one end of a rod 25' which extends through an opening in the spindle 18'. Attached to the other end of the rod 25' is a pin 26' whose ends extend out through oppositely disposed elongated openings or guides 27' and engage the outer side of an annular member 28' against which the inner end of the spring 29' seats. Thus when the nut 30' is turned in one direction or the other the rod 25' is caused to move in or out of the opening in the spindle 18' and through the medium of the pin 26' and the annular member 28' decreases or increases the tension on the spring 29'.

In another embodiment of this invention shown in Figs. 10 and 11, there are provided centrifugal weights 36 in the form of the usual type of ball governor, to balance the twisting moments on the blades produced by centrifugal force when the blades are rotating due to the sweep-back and rake of the normally used propeller blades and to insure that the blades assume the proper pitch for the existing conditions of flight. The weights, in this case, almost exactly balance the twisting moments on the propeller blades due to centrifugal force. In fact, the weights slightly overbalance the turning forces and this slight excess force is taken care of by the spring 42. The spring 42 in this case may, therefore, be very much lighter and more sensitive than the springs which are required in the structures shown in Figs. 7 and 9 which in those structures are required to neutralize or to balance the entire turning forces acting on the blades.

As shown in Figs. 10 and 11, the weights 36 are attached to the free ends of the arms 35 which are fulcrumed at 37 on a collar 38 in such manner that they may swing outwardly in opposite directions intermediate the cranks 13 when acted upon by centrifugal force. The collar 38 is mounted adjacent the outer end of the spindle 39 and is held in a predetermined fixed position thereon by means of a set screw 48. A flanged nut 41 which engages with threads provided on the spindle 39 is mounted on said spindle adjacent the collar 38, the flange of said nut serving as a seat for the spring 42 which is mounted axially of the spindle 39 and is seated at its other end against the sleeve 43. The spring 42 may be calibrated or adjusted for the exact required speed of the propeller by varying the position of the flanged nut 41 on the spindle 39. A set-screw 40 maintains the flanged nut 41 in fixed position on the spindle 39.

Pivotally secured to the arms 35 at predetermined points 44 intermediate the weights 36 and the fulcrums 37 are lever arms or links 45, the other ends of which are pivotally secured to brackets 46 on a collar 47 which is mounted in a recessed portion of the sleeve 43. Thus with this arrangement any outward movement of the arms 35 due to centrifugal force acting on the balls 36 while the propeller is rotating will cause the lever arms or links 45 to move the sleeve 43 against the spring 42 compressing it. The motor of the plane rotates the right-hand propeller shown in Fig. 10 in a counter-clockwise direction, as viewed in Fig. 10. Under normal operation of the motor the elements are in the position illustrated, the outward force exerted by the rotating weights 36 on the sleeve 43 exactly balancing the forces exerted inwardly on the sleeve 43 by the spring 42 and the twisting moments on the blades through the ball and socket connection 15, 16. Should the plane, however, ascend to altitudes of more rarefied air, the lessened resistance of the air to the propeller blades will cause an increase in the speed of the motor. This increase of speed will cause the centrifugal force acting on the blades to increase to such an extent that it will overcome the opposing air resistance on the blades caused by and proportional to the speed of the plane and produce a twisting moment in the blades in the direction indicated by the broken arrows in Fig. 10, due to the fact that the blades are not symmetrical about their radial center line. The twisting blades will cause the shafts 9 to rotate in the same direction and through the ball and socket connections 15, 16, will force the sleeve 43 inwardly on the spindle 39. At the same time the increased speed of the motor will also cause the arms 35 of the governor to move outwardly due to the influence of centrifugal force on the weights 36 thus operating to move the sleeve 43 outwardly against the force of the spring 42 and the force exerted by the twisting blades on such sleeve through the ball and socket connection 15, 16. When the balls 36 have attained a position under the influence of centrifugal force where the outward force exerted on the sleeve 43 by the arm 35 exactly balances the combined inward forces acting on said sleeve by the spring 42 and the twisting moments on the blades, the turning movement of the blades will be checked by the governor. In this position the blades will have assumed a pitch at which the motor makes use of its full power and they will remain in that position until a change of conditions again operates to change the speed of the motor.

The governor type mechanism illustrated in Figs. 10 and 11 may be also utilized for automatically controlling the pitch of propeller blades symmetrically disposed about their radial center line or without sweep-back and rake which develops the turning movement in the ordinary propeller blades. In this case the weights 36 should be sufficiently heavy to overcome the twisting moments on the blades produced by air resistance as the plane goes through the air.

The balancing of the forces acting on propeller blades having sweep-back and rake may be also accomplished by adding weights on the blades or blade shafts themselves thus dispensing with the governor mechanism shown in Figs. 10 and 11. The construction shown in Figs. 1–9 inclusive would then be used, in which case, the spring need only be of sufficient compressive strength to take care of the excess force one way or the other. In the preferred form of this construction the weights added outside would be slightly less in weight than is necessary to balance the twisting moments on the propeller blades and the spring would take care of the excess.

The hub 10 is preferably made in two sections 12 and 12' which are held together by suitable means such as the threaded bolts 33 shown in Fig. 7, in order that the parts may be readily dismantled for repair or replacement.

Although two blades are shown in the drawings, it is possible to use three or four blades. In that case the sleeves 19 and 43 will support additional transverse elements having ball members on the ends thereof to engage socket members attached to the studs of the additional blades. The device will function in a manner similar to that hereinbefore explained.

From the foregoing description of my invention it will be observed that the invention makes available for work all the power developed by the motor under all conditions and under all varying conditions because it allows the propeller blades to automatically assume the pitch best suited for existing conditions of flight. The motor, if not usefully employing the full power it develops at any time during the flight of the plane as in the case where the air resistance on the blades is lessened, will speed up, increasing the speed of rotation of the propeller and causing a resulting increase of the centrifugal force acting on the propeller blades. The component of centrifugal force which tends to twist the propeller blades about their axes due to the fact that the blades are not symmetrical about their radial center lines is thus increased and is utilized, according to the invention, to increase the pitch of the blades to a position where the full output of which the motor is capable will be utilized to do the work demanded by the existing conditions.

The invention is also adaptable to constant speed engines such as engines of the Diesel type where the device acts as a governor to maintain the speed of said engine constant under all flying conditions or when built on a small scale, for driving constant speed auxiliaries on an airplane, such as small electric generators for wireless, pumps, etc., where it is desirable to drive such auxiliaries at a constant speed independent of the air speed of the plane. The structure shown in Figs. 10 and 11 is particularly adaptable for this latter purpose and provides a very low cost constant speed driving mechanism.

Although I have shown and described two types of means to balance the force exerted on the transverse element 17 by the propeller blades as they are turned about their longitudinal axes under the influence of the twisting moments produced thereon by centrifugal force when the blades are rotating, whereby such blades are enabled to assume and maintain the pitch which is best suited for existing conditions of flight, it will be understood that other means which will accomplish the same purpose may be employed within the scope of the invention, and that various changes in the form, construction and arrangement of the several parts may also be resorted to without departing from the spirit and scope of the invention; hence I do not wish to limit myself strictly to the specific embodiments of the invention herein set forth.

I claim:

1. In a variable pitch propeller, a rotatable supporting hollow structure, a plurality of blades having sweep-back and rake, mounted at their inner ends on said structure for rotatable movement about their longitudinal axes by the action of centrifugal force thereon, and means for balancing the centrifugal force produced on said blades due to sweep-back and rake so that such blades will assume the proper pitch for existing conditions, said means comprising a member centrally disposed within said supporting structure for axial movement therein intermediate the inner ends of said blades, said member being also rotatable with relation to said supporting structure, means operatively connecting said member to the inner ends of said blades and adapted to cause said member to move with a progressive rotary motion along the axis of said supporting structure when the blades are rotated about their longitudinal axes, and sensitive means which yieldingly resist movement of said member by said rotatably movable blades beyond the normal degree of sensitiveness of the sensitive means.

2. In a variable pitch propeller, a rotatable supporting hollow structure, a plurality of blades having sweep-back and rake mounted at their inner ends on said structure for rotatable movement about their longitudinal axes by the action of centrifugal force thereon, and means for balancing the centrifugal force produced on said blades due to sweep-back and rake so that such blades will assume the proper pitch for existing conditions, said means comprising a shaft centrally disposed within said supporting structure and extending transversely of said blades intermediate the inner ends thereof, a member slidably and rotatably mounted on said shaft, means operatively connecting said member to the inner ends of said blades and adapted to cause said member to move with a progressive rotary motion along said shaft when the blades are rotated about their longitudinal axes, and a sensitive agent which yieldingly resists movement of said member by said blades beyond the normal degree of sensitiveness of the sensitive agent.

3. In a variable pitch propeller, a rotatably supporting hollow structure, a plurality of blades having sweep-back and rake, mounted at their inner ends on said structure for rotatable movement about their longitudinal axes by the action of centrifugal force thereon, and means for balancing the centrifugal force produced on said blades due to sweep-back and rake so that such blades will assume the proper pitch for existing conditions, said means comprising a member centrally disposed within said supporting structure for axial movement therein intermediate the inner ends of said blades, said member being also rotatable with relation to said supporting structure, means operatively connecting said member to the inner ends of said blades and adapted to cause said member to move with a progressive rotary motion along the axis of said supporting structure when the blades are rotated about their longitudinal axes, sensitive means which yieldingly resists rotation of said blades in one direction and assists rotation of said blades in another direction, said means being operatively connected to said member, means for varying the sensitiveness of the sensitive means and means to limit the movement of said member.

4. In a variable pitch propeller, a rotatable supporting hollow structure, a plurality of blades having sweep-back and rake, mounted at their inner ends on said structure for rotatable movement about their longitudinal axes by the action of centrifugal force thereon, and means for balancing the centrifugal force produced on said blades due to sweep-back and rake so that such blades will assume the proper pitch for existing conditions, said means comprising a crank arm secured to the inner end of each blade, a rigid member centrally disposed within said supporting structure for axial movement therein intermediate the inner ends of said blades, said member being also rotatable with relation to said supporting structure, means operatively connecting said member with said crank arms, whereby said member is caused to move with a progressive rotary motion along the axis of said supporting structure when the crank arms and blades are rotated about the longitudinal axes of the latter, and sensitive means which yieldingly resists movement of said member by said rotatably movable blades beyond the normal degree of sensitiveness of the sensitive means.

5. In a variable pitch propeller, a rotatable supporting hollow structure, a plurality of blades having sweep-back and rake, mounted at their inner ends on said structure for rotatable movement about their longitudinal axes by the action of centrifugal force thereon, anti-friction means for holding said blades in proper position with respect to said supporting structure, and means for balancing the centrifugal force produced on said blades due to sweep-back and rake so that such blades will assume the proper pitch for existing conditions, said means comprising a crank arm secured to the inner end of each blade, a rigid member centrally disposed within said supporting structure for axial movement therein intermediate the inner ends of said blades, said member being also rotatable with relation to said supporting structure, universal means operatively connecting said member with said crank arms, whereby said member is caused to move with a progressive rotary motion along the axis of said supporting structure when the crank arms and blades are rotated about the longitudinal axes of the latter, a spring adapted to hold said member in a predetermined position in said supporting structure, thereby maintaining said blades at a predetermined pitch, said spring being so situated that it can be further compressed by rotation of the blades as the centrifugal force on said blades increases, and means for varying the sensitiveness of said spring.

6. In a variable pitch propeller, a rotatable supporting hollow structure, a plurality of blades having sweep-back and rake, mounted at their inner ends on said structure for rotatable movement about their longitudinal axes by the action of centrifugal force thereon, and means for balancing the centrifugal force produced on said blades due to sweep-back and rake so that such blades will assume the proper pitch for existing conditions, said means comprising a crank arm secured to the inner end of said blade, a shaft centrally disposed within said supporting structure intermediate the inner ends of said blades, a lever which is rotatable and slidable on said shaft, a ball and socket connection between the ends of said lever and said crank arms, whereby said lever is caused to move with a progressive rotary motion along said shaft when the crank arms and blades are rotated about the longitudinal axes of the latter, means for holding said lever in a predetermined position on said shaft, thereby maintaining said blades at a predetermined pitch, said means being adapted to resist slidable movement of said lever caused by rotatable movement of said blades due to an increase in centrifugal force on said blades.

7. In a variable pitch propeller, a rotatable supporting hollow structure, a plurality of blades having sweep-back and rake, mounted at their inner ends on said structure for rotatable movement about their longitudinal axes by the action of centrifugal force thereon, and means for balancing the centrifugal force produced on said blades due to sweep-back and rake so that such blades will assume the proper pitch for existing conditions, said means comprising a crank arm secured to the inner end of each blade, a shaft centrally disposed within said supporting structure intermediate the inner ends of said blades, a sleeve adapted for rotatable and slidable motion on said shaft, said sleeve being provided with arms extending transversely of said shaft, universal means operatively connecting the end of each arm with a crank arm, whereby said sleeve is caused to move with a progressive rotary motion along said shaft when the crank arms and blades are rotated about the longitudinal axes of the latter, means for holding said sleeve in a predetermined position on said shaft, thereby maintaining said blades at a predetermined pitch, said means being adapted to yieldingly resist slidable movement of said sleeve on said shaft in one direction, means for adjusting the resistance of said last mentioned means, and means to limit the rotation of said blades.

8. In a variable pitch propeller, a rotatable supporting hollow structure, a plurality of blades mounted at their inner ends on said structure for rotatable movement and means actuated by the centrifugal force produced by rotation of said blades about the axis of said structure for rotating said blades about their longitudinal axes and for insuring that such blades will assume the proper pitch for existing conditions, said means comprising a member centrally disposed within said supporting structure for axial and rotatable movement therein intermediate the inner ends of said blades, an operative connection between the inner ends of said rotatably movable blades and said member, whereby the latter is caused to move with a progressive rotary motion along the axis of said supporting structure when the blades are rotated about their longitudinal axes, rotatable means controlled by centrifugal force to control the movement of said member, and means to limit the movement of said member.

9. In a variable pitch propeller, a rotatable supporting hollow structure, a plurality of blades mounted at their inner ends on said structure for rotatable movement about their longitudinal axes, and means actuated by the centrifugal force produced by rotation of said blades about the axis of said structure for rotating said blades about their longitudinal axes and for insuring that said blades will assume the proper pitch for existing conditions, said means comprising a member centrally disposed within said supporting structure for axial and rotatable movement therein intermediate the inner ends of said blades, an operative connection between the inner ends of said rotatably movable blades and said member, whereby the latter is caused to move with a progressive rotary motion along the axis of said supporting structure when the blades are rotated about their longitudinal axes, means controlled by centrifugal force to control the movement of said member and means to retain said member in a predetermined position in said supporting structure at normal rotation thereof, said means being adapted to yieldingly resist said centrifugally controlled means as the rotation of said supporting structure is increased.

10. In a variable pitch propeller, a rotatable supporting hollow structure, a plurality of blades mounted at their inner ends on said structure for rotatable movement, means positioned within said hollow structure and actuated by the centrifugal force produced by rotation of said blades about the axis of said structure for rotating said blades about their longitudinal axes and for insuring that said blades will assume the proper pitch for existing conditions, said means comprising a shaft centrally disposed within said supporting structure intermediate the inner ends of said blades, a lever slidably and rotatably mounted on said shaft, means operatively connecting the ends of said lever to the inner ends of said blades, whereby said lever is caused to move with a progressive rotary motion along said shaft when the blades are rotated about their longitudinal axes, a governor supported on said shaft, means connecting said governor to said slidably and rotatably movable lever, whereby the latter is caused to move axially on said shaft as the rotation of said supporting structure is increased or decreased and means to balance the axial force of said governor at normal rotation of said supporting structure, said means being adapted to yieldingly resist said governor as the rotation of said supporting structure is increased.

11. In a variable pitch propeller, a rotatable supporting hollow structure, a plurality of blades mounted at their inner ends on said structure for rotatable movement about their longitudinal axes, and means actuated by the centrifugal force produced by rotation of said blades about the axis of said structure for rotating said blades about their longitudinal axes and for insuring that said blades will assume the proper pitch for existing conditions, said means comprising a crank arm secured to the inner end of each blade, and positioned within said hollow structure, a shaft centrally disposed within said supporting structure intermediate the inner ends of said blades, a lever that is slidably and rotatably mounted on said shaft, an operative connection between said lever and said crank arms, whereby said lever is caused to move with a progressive rotary motion along said shaft when the crank arms and blades are rotated about the longitudinal axes of the latter, weighted arms positioned within said hollow structure and pivoted on said shaft for movement toward or away from said shaft, said arms being operatively connected to said lever to control the movement thereof, and a sensitive means which yieldingly resists movement of said lever on said shaft.

HENRY S. HUBBELL.